(12) United States Patent
Rodgers et al.

(10) Patent No.: US 6,396,005 B2
(45) Date of Patent: May 28, 2002

(54) METHOD AND APPARATUS FOR DIMINISHING GRID COMPLEXITY IN A TABLET

(75) Inventors: James L. Rodgers; Howard K. Jaecks, both of Mesa; Billy C. Fowler, Phoenix, all of AZ (US)

(73) Assignee: Rodgers Technology Center, Inc., Tempe, AZ (US)

( * ) Notice: Subject to any disclaimer, the term of this patent is extended or adjusted under 35 U.S.C. 154(b) by 0 days.

(21) Appl. No.: 09/797,407

(22) Filed: Mar. 1, 2001

Related U.S. Application Data

(63) Continuation of application No. 09/094,751, filed on Jun. 15, 1998, now abandoned.

(51) Int. Cl.[7] ................................................ G08C 21/00
(52) U.S. Cl. .................. 178/18.01; 178/19.01
(58) Field of Search ................................ 345/156, 173, 345/179, 182; 178/18.01, 18.02, 19.01

(56) References Cited

U.S. PATENT DOCUMENTS

| | | | |
|---|---|---|---|
| 3,567,859 A | 3/1971 | Ellis et al. ..................... 178/18 |
| 3,801,733 A | 4/1974 | Bailey ......................... 178/19 |
| 3,886,311 A | 5/1975 | Rodgers et al. ............... 178/18 |
| 3,974,332 A | 8/1976 | Abe et al. ..................... 178/18 |
| 4,054,746 A | 10/1977 | Kamm ......................... 178/19 |
| 4,080,515 A | 3/1978 | Anderson ..................... 178/19 |
| 4,081,603 A | 3/1978 | Davis et al. .................. 178/19 |
| 4,177,421 A | 12/1979 | Thornburg .................... 324/61 |
| 4,178,481 A | 12/1979 | Kley ........................... 178/18 |
| 4,185,165 A | 1/1980 | Fenci .......................... 178/19 |
| 4,206,314 A | 6/1980 | Prugh et al. .................. 178/19 |
| 4,210,775 A | 7/1980 | Rodgers et al. ............... 178/19 |
| 4,213,005 A | 7/1980 | Cameron ...................... 178/19 |
| 4,240,065 A | 12/1980 | Howbrook ............... 340/146.3 |
| 4,289,927 A | 9/1981 | Rodgers ...................... 178/19 |
| 4,313,113 A | 1/1982 | Thornburg ................... 340/709 |
| 4,318,096 A | 3/1982 | Thornburg et al. ......... 340/706 |
| 4,378,465 A | 3/1983 | Green et al. .................. 178/19 |
| 4,389,711 A | 6/1983 | Hotta et al. .................. 364/556 |
| 4,397,033 A | 8/1983 | Bechet .......................... 382/3 |
| 4,418,242 A | 11/1983 | Kouno ......................... 178/19 |
| 4,451,698 A | 5/1984 | Whetstone et al. ........... 178/19 |
| 4,471,162 A | 9/1984 | Aono et al. ................... 178/19 |
| 4,492,819 A | 1/1985 | Rodgers et al. ............... 178/18 |
| 4,495,269 A | 1/1985 | Bialczak et al. ............ 430/150 |
| 4,507,523 A | 3/1985 | Gohara et al. ................. 178/19 |
| 4,521,772 A | 6/1985 | Lyon .......................... 340/710 |
| 4,552,991 A | 11/1985 | Hulls .......................... 178/19 |
| 4,564,572 A | 1/1986 | Morishita et al. ............. 430/28 |
| 4,577,058 A | 3/1986 | Collins ........................ 178/18 |
| 4,580,830 A | 4/1986 | Holt et al. ................... 296/182 |
| 4,582,955 A | 4/1986 | Blesser ........................ 178/19 |
| 4,609,776 A | 9/1986 | Murakami et al. ............ 178/18 |
| 4,409,479 A | 10/1986 | Sprague et al. ............. 250/237 |
| 4,616,106 A | 10/1986 | Fowler et al. ................ 178/18 |
| 4,617,515 A | 10/1986 | Taguchi et al. ............. 324/207 |
| 4,423,286 A | 12/1986 | Bergeron ..................... 178/19 |
| 4,631,356 A | 12/1986 | Taguchi et al. ............... 178/19 |
| 4,634,973 A | 1/1987 | Murakami et al. ........... 324/207 |
| 4,641,354 A | 2/1987 | Fukunaga et al. ............ 382/13 |
| 4,644,102 A | 2/1987 | Blesser et al. ................ 178/19 |
| 4,646,073 A | 2/1987 | Fukunaga et al. .......... 340/709 |
| 4,653,107 A | 3/1987 | Shojima et al. ............... 382/13 |
| 4,658,373 A | 4/1987 | Murakami et al. .......... 364/559 |
| 4,658,429 A | 4/1987 | Orita et al. ................... 382/36 |
| 4,661,656 A | 4/1987 | Rodgers et al. ............... 178/18 |
| 4,665,282 A | 5/1987 | Sato et al. .................... 178/18 |

(List continued on next page.)

*Primary Examiner*—Amare Mengistu
(74) *Attorney, Agent, or Firm*—Schwegman, Lundberg, Woessner & Kluth, P.A.

(57) ABSTRACT

A grid consists of a first serpentine, and a second serpentine overlapping the first serpentine. Signals from the first and second serpentines are analyzed to determine transducer position. The first and second serpentines are foldback serpentines. The first serpentine is offset from the second serpentine by approximately ninety degrees.

44 Claims, 11 Drawing Sheets

U.S. PATENT DOCUMENTS

| | | | | |
|---|---|---|---|---|
| 4,672,154 | A | 6/1987 | Rodgers et al. | 178/19 |
| 4,678,869 | A | 7/1987 | Kable | 178/19 |
| 4,678,870 | A | 7/1987 | Taguchi et al. | 178/19 |
| 4,680,804 | A | 7/1987 | Kuzunuki et al. | 382/13 |
| 4,694,124 | A | 9/1987 | Blesser | 178/19 |
| 4,697,244 | A | 9/1987 | Murakami et al. | 364/520 |
| 4,704,501 | A | 11/1987 | Taguchi et al. | 178/19 |
| 4,705,919 | A | 11/1987 | Dhawn | 178/19 |
| 4,711,977 | A | 12/1987 | Miyamori et al. | 178/18 |
| 4,718,103 | A | 1/1988 | Shojima et al. | 382/13 |
| D294,263 | S | 2/1988 | Rodgers et al. | D14/114 |
| 4,728,944 | A | 3/1988 | Tamara et al. | 340/706 |
| 4,729,108 | A | 3/1988 | Uchiyama | 364/520 |
| 4,730,186 | A | 3/1988 | Koga et al. | 340/708 |
| 4,734,546 | A | 3/1988 | Landmeier | 178/19 |
| 4,736,073 | A | 4/1988 | Abernethy | 178/19 |
| 4,740,660 | A | 4/1988 | Kimura | 178/19 |
| 4,748,295 | A | 5/1988 | Rogers | 178/19 |
| 4,755,707 | A | 7/1988 | Nakaya et al. | 310/334 |
| 4,771,138 | A | 9/1988 | Dhawan | 178/19 |
| 4,777,510 | A | 10/1988 | Russell | 355/7 |
| 4,786,764 | A | 11/1988 | Padula et al. | 178/18 |
| 4,786,765 | A | 11/1988 | Yamanami et al. | 178/19 |
| 4,789,855 | A | 12/1988 | Ozeki | 340/703 |
| 4,794,208 | A | 12/1988 | Watson | 178/19 |
| 4,798,920 | A | 1/1989 | Makino et al. | 178/19 |
| 4,807,166 | A | 2/1989 | Zalenski | 364/571.06 |
| 4,810,838 | A | 3/1989 | Ichinokawn e tal. | 178/19 |
| 4,820,886 | A | 4/1989 | Watson | 178/19 |
| 4,831,566 | A | 5/1989 | Matthews et al. | 364/571.05 |
| 4,832,144 | A | 5/1989 | Murakami et al. | 178/18 |
| 4,835,347 | A | 5/1989 | Watson | 178/19 |
| 4,845,478 | A | 7/1989 | Taguchi et al. | 340/712 |
| 4,845,651 | A | 7/1989 | Aizawa et al. | 364/522 |
| 4,847,788 | A | 7/1989 | Shimada et al. | 364/522 |
| 4,848,496 | A | 7/1989 | Murakami et al. | 178/19 |
| 4,857,903 | A | 8/1989 | Zalenski | 340/710 |
| 4,858,150 | A | 8/1989 | Aizawa et al. | 364/522 |
| 4,859,813 | A | 8/1989 | Rockwell | 178/18 |
| 4,860,372 | A | 8/1989 | Kuzunuki et al. | 382/13 |
| 4,862,217 | A | 8/1989 | Russel | 355/218 |
| 4,872,000 | A | 10/1989 | Kano et al. | 340/706 |
| 4,878,249 | A | 10/1989 | Mifune et al. | 382/13 |
| D304,446 | S | 11/1989 | Hoover et al. | D14/114 |
| D304,449 | S | 11/1989 | Rodgers et al. | D14/114 |
| 4,878,553 | A | 11/1989 | Yamanami et al. | 178/18 |
| 4,890,096 | A | 12/1989 | Taguchi et al. | 340/712 |
| 4,894,125 | A | 1/1990 | Fenolia et al. | 204/33 |
| 4,896,002 | A | 1/1990 | Papsin | 178/18 |
| 4,901,250 | A | 2/1990 | Ishida | 364/521 |
| 4,902,858 | A | 2/1990 | Yamanami et al. | 178/19 |
| 4,928,256 | A | 5/1990 | Parnell | 364/561 |
| 4,933,671 | A | 6/1990 | McCount | 340/710 |
| 4,936,683 | A | 6/1990 | Purcell | 356/152 |
| 4,943,689 | A | 7/1990 | Siefer et al. | 178/18 |
| 4,944,034 | A | 7/1990 | Ohsawa | 364/522 |
| 4,945,348 | A | 7/1990 | Ibamoto et al. | 340/784 |
| 4,948,926 | A | 8/1990 | Murakami et al. | 178/19 |
| 4,952,757 | A | 8/1990 | Purcell et al. | 178/19 |
| 4,954,301 | A | 9/1990 | Saeki et al. | 264/40.1 |
| 4,956,526 | A | 9/1990 | Murakami et al. | 178/18 |
| 4,956,926 | A | 9/1990 | Glorioso | 34/111 |
| 4,958,147 | A | 9/1990 | Kanema et al. | 340/706 |
| 4,963,703 | A | 10/1990 | Phillips et al. | 178/19 |
| 4,967,244 | A | 10/1990 | Bauer | 357/23.4 |
| 4,974,175 | A | 11/1990 | Suzuki et al. | 365/522 |
| 4,977,315 | A | 12/1990 | Purcell | 250/221 |
| 4,985,602 | A | 1/1991 | Kouhia | 178/18 |
| 4,988,836 | A | 1/1991 | Murray | 178/18 |
| 4,988,837 | A | 1/1991 | Murakami et al. | 178/18 |
| 4,990,726 | A | 2/1991 | Lasley | 178/19 |
| 4,992,630 | A | 2/1991 | Mletzko | 178/18 |
| 4,994,989 | A | 2/1991 | Usami et al. | 364/522 |
| 4,996,393 | A | 2/1991 | Zalenski et al. | 178/19 |
| 4,999,461 | A | 3/1991 | Murakami et al. | 178/19 |
| 4,999,462 | A | 3/1991 | Purcell | 178/19 |
| 5,001,306 | A | 3/1991 | Purcell | 178/18 |
| 5,003,616 | A | 3/1991 | Orita et al. | 382/41 |
| 5,004,871 | A | 4/1991 | Purcell | 178/18 |
| 5,004,872 | A | 4/1991 | Lasley | 178/18 |
| 5,014,044 | A | 5/1991 | Murray | 340/710 |
| 5,023,408 | A | 6/1991 | Murakami et al. | 178/19 |
| 5,028,744 | A | 7/1991 | Purcell et al. | 178/18 |
| 5,045,645 | A | 9/1991 | Hoendervoogt et al. | 178/19 |
| 5,049,862 | A | 9/1991 | Dao et al. | 340/706 |
| 5,051,545 | A | 9/1991 | McDermott | 178/19 |
| 5,055,831 | A | 10/1991 | Padula | 340/706 |
| 5,061,828 | A | 10/1991 | Purcell | 178/18 |
| 5,066,833 | A | 11/1991 | Zalenski | 178/19 |
| RE33,936 | E | 5/1992 | Miya et al. | 178/18 |
| 5,111,005 | A | 5/1992 | Smith et al. | 178/19 |
| 5,113,042 | A | 5/1992 | Mletzko | 178/19 |
| 5,124,509 | A | 6/1992 | Hoendervoogt et al. | 178/19 |
| 5,130,500 | A | 7/1992 | Murakami | 178/19 |
| 5,134,253 | A | 7/1992 | Doubrava | 178/19 |
| 5,134,689 | A | 7/1992 | Murakami et al. | 395/143 |
| 5,136,125 | A | 8/1992 | Russell | 178/19 |
| 5,138,118 | A | 8/1992 | Russell | 178/19 |
| 5,146,566 | A | 9/1992 | Hollis, Jr. et al. | 395/275 |
| 5,148,016 | A | 9/1992 | Murakami et al. | 250/221 |
| RE34,095 | E | 10/1992 | Padula et al. | 178/18 |
| 5,153,386 | A | 10/1992 | Siefer et al. | 178/18 |
| 5,157,227 | A | 10/1992 | McDermott et al. | 178/19 |
| 5,160,487 | A | 11/1992 | Morishita et al. | 430/59 |
| 5,173,793 | A | 12/1992 | Purcell | 359/85 |
| 5,179,254 | A | 1/1993 | McDermott | 178/18 |
| 5,179,642 | A | 1/1993 | Komatsu | 395/132 |
| D333,133 | S | 2/1993 | Hirota | D14/114 |
| RE34,187 | E | 3/1993 | Yamanami et al. | 178/19 |
| 5,191,480 | A | 3/1993 | Murray et al. | 359/808 |
| 5,191,622 | A | 3/1993 | Shojima et al. | 382/13 |
| 5,194,699 | A | 3/1993 | Zalenski | 178/19 |
| 5,198,623 | A | 3/1993 | Landmeier | 178/19 |
| 5,206,785 | A | 4/1993 | Hukashima | 361/283 |
| 5,210,380 | A | 5/1993 | McDermott et al. | 178/19 |
| 5,218,173 | A | 6/1993 | Garwin et al. | 178/18 |
| 5,218,174 | A | 6/1993 | Gray et al. | 178/19 |
| 5,225,637 | A | 7/1993 | Rodgers | 178/19 |
| 5,225,959 | A | 7/1993 | Stearns | 361/283 |
| 5,227,551 | A | 7/1993 | Bachman et al. | 585/12 |
| 5,227,909 | A | 7/1993 | Watson | 359/196 |
| 5,228,124 | A | 7/1993 | Kaga et al. | 395/161 |
| 5,229,551 | A | 7/1993 | McDermott et al. | 178/19 |
| 5,235,142 | A | 8/1993 | Landmeier et al. | 178/19 |
| 5,237,653 | A | 8/1993 | Noguchi et al. | 395/158 |
| 5,239,489 | A | 8/1993 | Russell | 364/560 |
| 5,247,138 | A | 9/1993 | Landmeier | 178/19 |
| 5,270,692 | A | 12/1993 | Rockwell | 345/163 |
| 5,287,105 | A | 2/1994 | Schlotterbeck et al. | 241/20 |
| 5,297,254 | A | 3/1994 | Arai et al. | 395/161 |
| 5,298,689 | A | 3/1994 | Mohri et al. | 178/19 |
| 5,302,967 | A | 4/1994 | Yonezawa et al. | 345/131 |
| 5,303,337 | A | 4/1994 | Ishida | 395/119 |
| 5,325,110 | A | 6/1994 | Tang et al. | 345/157 |
| 5,325,398 | A | 6/1994 | Murakami et al. | 735/21 |
| 5,326,940 | A | 7/1994 | Doubrava et al. | 178/18 |
| 5,341,152 | A | 8/1994 | Arai et al. | 345/133 |
| 5,352,834 | A | 10/1994 | Morishita et al. | 564/309 |
| 5,353,397 | A | 10/1994 | Yokoyama et al. | 395/145 |
| 5,357,061 | A | 10/1994 | Crutchfield | 178/18 |
| 5,357,062 | A | 10/1994 | Rockwell et al. | 178/18 |

| Patent No. | Date | Inventor | Class |
|---|---|---|---|
| 5,369,227 A | 11/1994 | Stone | 178/18 |
| 5,369,228 A | 11/1994 | Faust | 178/18 |
| 5,373,118 A | 12/1994 | Watson | 178/19 |
| RE34,835 E | 1/1995 | Ozeki | 345/153 |
| 5,378,904 A | 1/1995 | Suzuki et al. | 257/208 |
| 5,379,371 A | 1/1995 | Usami et al. | 395/128 |
| 5,379,374 A | 1/1995 | Ishizaki et al. | 395/155 |
| 5,381,160 A | 1/1995 | Landmeier | 345/174 |
| 5,384,688 A | 1/1995 | Rockwell | 361/736 |
| 5,396,443 A | 3/1995 | Mese et al. | 364/707 |
| 5,403,958 A | 4/1995 | Morishita et al. | 564/433 |
| 5,404,439 A | 4/1995 | Moran et al. | 395/155 |
| 5,408,055 A | 4/1995 | Harris et al. | 178/19 |
| 5,416,280 A | 5/1995 | McDermott et al. | 178/19 |
| 5,425,109 A | 6/1995 | Saga et al. | 382/187 |
| 5,432,525 A | 7/1995 | Maruo et al. | 345/2 |
| 5,435,109 A | 7/1995 | Kim | 52/585.1 |
| 5,436,598 A | 7/1995 | Harris | 331/11 |
| 5,442,715 A | 8/1995 | Gaborski et al. | 382/187 |
| 5,446,377 A | 8/1995 | Mohri et al. | 324/207.13 |
| 5,455,906 A | 10/1995 | Usuda | 395/162 |
| 5,495,269 A | 2/1996 | Elrod et al. | 345/179 |
| 5,497,176 A | 3/1996 | Sasaki | 345/173 |
| 5,500,935 A | 3/1996 | Moran et al. | 395/156 |
| 5,506,375 A | 4/1996 | Kikuchi | 178/18 |
| 5,511,148 A | 4/1996 | Wellner | 395/106 |
| 5,525,981 A | 6/1996 | Abernethy | 341/34 |
| 5,526,023 A | 6/1996 | Sugimoto et al. | 345/173 |
| 5,533,141 A | 7/1996 | Fatatsugi et al. | 382/119 |
| 5,535,119 A | 7/1996 | Ito et al. | 364/419.03 |
| 5,537,633 A | 7/1996 | Suzuki et al. | 395/600 |
| 5,548,346 A | 8/1996 | Mimura et al. | 348/738 |
| 5,548,705 A | 8/1996 | Moran et al. | 395/159 |
| RE35,329 E | 9/1996 | Murakami et al. | 178/19 |
| 5,554,827 A | 9/1996 | Oda | 178/18 |
| 5,854,449 A | 12/1998 | Adkins | 178/18.02 |

METHOD AND APPARATUS FOR DIMINISHING GRID COMPLEXITY IN A TABLET

This application is a continuation of U.S. patent application Ser. No. 09/094,751, filed Jun. 15, 1998 now abandoned.

FIELD OF THE INVENTION

The invention generally relates to electrical technology and, more specifically, to a method and apparatus for diminishing grid complexity in a tablet.

BACKGROUND OF THE INVENTION

Tablets are conventionally used to enter data, such as drawings or scripted text, into an electrical system, such as a computer. A user manipulates a transducer, such as a pen or a mouse, over the tablet to enter the data.

Tablets include complex grid patterns to accurately identify the position of the pointer on the tablet. U.S. Pat. No. 4,948,926 to Murakami et al., hereby incorporated by reference, illustrates an exemplary complex grid pattern.

Complex grid patterns are undesirable because they employ more grid lines, more internal and external interconnections and more selection multiplexers and other circuitry to operate them. Numerous lines and interconnections require narrower lines and less space between them and, therefore, require more elaborate and expensive grid processes and materials, such as etched copper on epoxy fiberglass, in contrast to less expensive, but less detailed, printed methods such as silver ink on Mylar® sheet. Therefore, there is a need for less complex and less expensive grid patterns, and their corresponding position resolving algorithms, that can accurately identify the position of a transducer, such as a pen or cursor, on a tablet or digitizer surface.

SUMMARY OF THE INVENTION

The invention solves the above-mentioned problems in the art and other problems which will be understood by those skilled in the art upon reading and understanding the specification. The invention provides a method and apparatus for diminishing grid complexity in a tablet. In all embodiments of the invention, reference to a transducer includes any device generating a magnetic-field including a pen, a cursor, a mouse, a puck or other related devices.

The invention provides a two-wire resolution grid, or antenna wire pattern, consisting of a first serpentine, and a second serpentine overlapping and substantially coplanar with the first serpentine. The second serpentine is offset from the first serpentine in the direction of the axes of the serpentines. Signals from the first and second serpentines are analyzed to determine transducer position within a period of a serpentine in the axis direction. In another embodiment, first and second serpentines are foldback serpentines. In yet another embodiment, the second serpentine is offset from the first serpentine by approximately ninety degrees, or approximately one quarter of one period. In one embodiment, the loop size of first and second serpentines is about one inch, resulting in a period of about two inches.

The two serpentine patterns operate together with signal processing algorithms, and their associated circuitry, to determine transducer position within a period to high dimensional accuracy. The signal pattern of one wire operates to compensate for the signal pattern of the other wire to increase linearity and, therefore, improve position resolution and accuracy. Additionally, the two-wire grid linearity helps optimize or minimize transducer tilt error, where tilting the transducer causes an undesired location change in the data.

These two-wire resolution grids are capable of determining fine position over an about two inch period when used with a pen transducer. This approximately two-inch resolution distance is limited by the signal strength and characteristics of existing pen transducers. Larger loop sizes can proportionally increase resolution distance when utilized with a cursor or other device having a larger diameter signal coil.

In one embodiment of the invention, loops of the serpentines of a resolution grid are rectangular. In a further embodiment, loops of the serpentines of a resolution grid are rounded. In yet another embodiment, loops of the serpentines of a resolution grid are angled.

In a further embodiment, the invention provides a three-wire resolution grid consisting of a first serpentine, a second serpentine overlapping and substantially coplanar with the first serpentine and a third serpentine overlapping and substantially coplanar with the first and second serpentines. The second serpentine is offset from the first serpentine in the direction of the axes of the serpentines. The third serpentine is offset from both the first and second serpentines in the direction of the axes of the serpentines. Signals from the serpentines are analyzed to determine transducer position within a period in the axis direction. Use of three wires improves linearity of the signal processing over a period of the resolution grid to increase feasible resolution distance relative to a two-wire resolution grid when used with a given transducer. As an example, if a two-wire grid is limited to a period of two inches due to transducer characteristics, a three-wire resolution grid would be capable of spanning a distance proportional to the number of wires, i.e., a period of three inches. In another embodiment, first, second and third serpentines are foldback serpentines. In yet another embodiment, the second serpentine is offset from the first serpentine by approximately sixty degrees and the third serpentine is offset from the first serpentine by approximately one hundred twenty degrees.

In a still further embodiment, the invention provides a multi-wire resolution grid comprising three or more overlapping and substantially coplanar serpentines. Each serpentine is offset from the first serpentine in the direction of the axes of the serpentines. Signals from the serpentines are analyzed to determine transducer position within a period of a serpentine in the axis direction. Use of three or more wires improves linearity of the signal processing over a period of the multi-wire resolution grid to increase feasible resolution distance relative to a resolution grid using fewer wires when used with a given transducer. As an example, if a three-wire grid is limited to a period of three inches due to transducer characteristics, a five-wire resolution grid would be capable of spanning a distance proportional to the number of wires, i.e., a period of five inches. In another embodiment, each serpentine is a foldback serpentine. In yet another embodiment, each serpentine is offset from other serpentines by an amount equal to approximately one hundred eighty degrees divided by the total number of serpentines.

In one embodiment, the invention provides a direction grid consisting of one two-wire resolution grid. The one two-wire resolution grid consists of one period of the first and second serpentines such that absolute transducer position is determinable in one dimension in the direction of the axis of the resolution grid. In a further embodiment, the first and second serpentines are foldback serpentines.

In another embodiment, the invention provides a directional grid consisting of two substantially coplanar resolution grids overlaid upon a substantially common axis. A first, or fine, resolution grid includes two or more periods. The fine resolution grid consists of a two-wire resolution grid. A second, or coarse, resolution grid includes one or more periods. The coarse resolution grid consists of a multi-wire resolution grid. The length of the period of the coarse resolution grid is greater than the length of the period of the fine resolution grid. The one or more periods of the coarse resolution grid substantially cover the multiple periods of the fine resolution grid. Relative position within a period of the fine resolution grid is compared to the relative position within a period of the coarse resolution grid such that the period of the fine resolution grid generating the signal can be determined and an absolute transducer position in one axis can be calculated. In this manner, accuracy can be defined by the period of the fine resolution grid while the coarse resolution grid allows determination of which period generated the signal. In yet another embodiment, the resolution grids are substantially concentric. In a further embodiment, the resolution grids comprise foldback serpentines.

Any resolution grid containing more than one period may include fractional periods. As an example, a fine resolution grid may contain four and one-half two-inch periods in use with a coarse resolution grid having three three-inch periods to cover substantially the same grid pattern area.

In a further embodiment, the invention provides a direction grid comprising a fine resolution grid and two or more coarse resolution grids. Each two or more coarse resolution grids overlay a portion of the fine resolution grid. The fine resolution grid consists of a two-wire resolution grid. The combined two or more coarse resolution grids substantially cover the multiple periods of the fine resolution grid. The coarse resolution grids overlay the fine resolution grid such that the coarse and fine resolution grids substantially share a common axis and plane, and the coarse resolution grids overlay substantially different portions of the fine resolution grid. Relative position within a period of the fine resolution grid is compared to the relative position within a period of a coarse resolution grid such that the period of the fine resolution grid generating the signal can be determined and an absolute transducer position in one axis can be calculated. In this manner, accuracy can be defined by the period of the fine resolution grid while the two or more coarse resolution grids allow determination of which period of the fine resolution grid generated the signal. In a still further embodiment, the coarse resolution grids are concentric. In yet another embodiment, the coarse resolution grids are segmented and substantially adjacent. In a still further embodiment, the periodic length of the segmented coarse resolution grids substantially equals the periodic length of the fine resolution grid, and one coarse resolution grid overlays each period of the fine resolution grid.

In yet another embodiment, the invention provides a directional grid comprising a fine resolution grid, a coarse resolution grid and a lateral resolution grid. The lateral resolution grid consists of a first foldback serpentine. The coarse resolution grid and lateral resolution grid overlay the fine resolution grid such that all grids substantially share a common axis and plane. The lateral resolution grid substantially covers the multiple periods of the fine resolution grid. Relative position within a period of the fine resolution grid is compared to the relative position within a period of the coarse resolution grid such that the period of the fine resolution grid generating the signal can be determined to be in one of two positions, each possible value occurring in different hemispheres of the grid plane. The lateral resolution grid allows determination of the hemisphere of the grid plane containing the period of the fine resolution grid generating the signal such that an absolute transducer position in one axis can be calculated. In this manner, accuracy can be defined by the period of the fine resolution grid while the coarse resolution grid and lateral resolution grid allow determination of which period of the fine resolution grid generated the signal. In still another embodiment of the invention, the lateral resolution grid further comprises one or more fragmented foldback serpentines. The one or more fragmented foldback serpentines of the lateral resolution grid overlay substantially different portions of the fine resolution grid, each being substantially concentric with the first foldback serpentine of the lateral resolution grid.

It should be noted that both the coarse and lateral resolution grids described provide primarily a gross positioning of the transducer location, while the fine resolution grid determines accuracy. Accordingly, both coarse and lateral resolution grids may hereinafter be described as gross resolution grids.

The invention also provides for a tablet comprising a first directional grid, or x-grid, and a second directional grid, or y-grid. The x-grid and y-grid each include one or more resolution grids. The x-grid and y-grid are overlaid and rotated about each other. Determination of absolute transducer position in one axis of each grid allows for a determination of absolute transducer position within the plane of the x-grid and y-grid. In another embodiment, the y-grid is substantially coplanar to, and rotated ninety degrees from, the x-grid.

In further embodiment, a tablet comprises an x-grid and a y-grid. An x-axis multiplexer is coupled to the x-grid. A y-axis multiplexer is coupled to the y-grid. An amplifier and filter is coupled to the x-axis and y-axis multiplexors. A synchronous detector is coupled to the amplifier and filter. An analog to digital (A/D) convertor is coupled to the synchronous detector. A NAND gate circuit is coupled to the A/D converter. A processor is coupled to the NAND gate circuit. A first level converter is coupled to the processor. A second level converter is coupled to the processor. The x-grid and y-grid each include a fine resolution grid and one or more gross resolution grids. Each fine resolution grid consists of a first serpentine and a second serpentine overlapping the first serpentine. Signals from the serpentines of the resolution grids are analyzed to determine transducer position.

In yet another embodiment, a system comprises a processor and a tablet coupled to the processor. The tablet includes an x-grid and a y-grid. An x-axis multiplexer is coupled to the x-grid. A y-axis multiplexer is coupled to the y-grid. An amplifier and filter is coupled to the x-axis and y-axis multiplexors. A synchronous detector is coupled to the amplifier and filter. An analog to digital (A/D) convertor is coupled to the synchronous detector. A NAND gate circuit is coupled to the A/D converter. A second processor is coupled to the NAND gate circuit. A first level converter is coupled to the second processor. A second level converter is coupled to the first and second processors. The x-grid and y-grid each include a fine resolution grid and one or more gross resolution grids. Each fine resolution grid consists of a first serpentine, and a second serpentine overlapping the first serpentine. The signals from the serpentines of the resolution grids are analyzed to determine transducer position. In another embodiment, one or more resolution grids comprise foldback serpentines.

In a still further embodiment, a system comprises a processor and a tablet coupled to the processor. The tablet includes an x-grid and a y-grid. An x-axis multiplexer is coupled to the x-grid. A y-axis multiplexer is coupled to the y-grid. An amplifier and filter is coupled to the x-axis and y-axis multiplexors. A synchronous detector is coupled to the amplifier and filter. An analog to digital (A/D) convertor is coupled to the synchronous detector. A NAND gate circuit is coupled to the A/D converter. A second processor is coupled to the NAND gate circuit. A first level converter is coupled to the second processor. A second level converter is coupled to the first and second processors. The x-grid and y-grid each include a fine resolution grid and one or more gross resolution grids. In another embodiment, one or more resolution grids comprise foldback serpentines.

In yet another embodiment, a system comprises a processor and a tablet coupled to the processor. The tablet includes an x-grid and a y-grid. An x-axis multiplexer is coupled to the x-grid. A y-axis multiplexer is coupled to the y-grid. An amplifier and filter is coupled to the x-axis and y-axis multiplexors. A synchronous detector is coupled to the amplifier and filter. An analog to digital (A/D) convertor is coupled to the synchronous detector. A NAND gate circuit is coupled to the A/D converter. A second processor is coupled to the NAND gate circuit. A first level converter is coupled to the second processor. A second level converter is coupled to the first and second processors. The x-grid and y-grid each include a fine resolution grid, a coarse resolution grid, and one or more gross resolution grids. In another embodiment, one or more resolution grids comprise foldback serpentines.

The total size of a resolution grid, direction grid, grid pattern or tablet of the invention is limited only by the size and number of serpentine periods and grid layers, and the practical limitations imposed by their electrical properties such as induction, capacitance, resistance and other properties.

In each embodiment, as will be apparent to those skilled in the art upon reading the specification, additional lines or resolution grids can be used around the edges to further expand the size of the tablet and to handle unique characteristics of the tablet associated with the boundary or edges.

It is an advantage of the invention that tablet cost and complexity is reduced, and grid accuracy is enhanced or maintained.

DETAILED DESCRIPTION OF THE EMBODIMENTS

In the following detailed description of the preferred embodiments, reference is made to the accompanying drawings which form a part hereof and in which is shown by way of illustration specific preferred embodiments in which the invention may be practiced. These embodiments are described in sufficient detail to enable persons skilled in the art to practice the invention, and it is to be understood that other embodiments may be utilized and that logical, mechanical and electrical changes may be made without departing from the scope of the invention. The following detailed description is, therefore, not to be taken in a limiting sense.

Figure 1A:
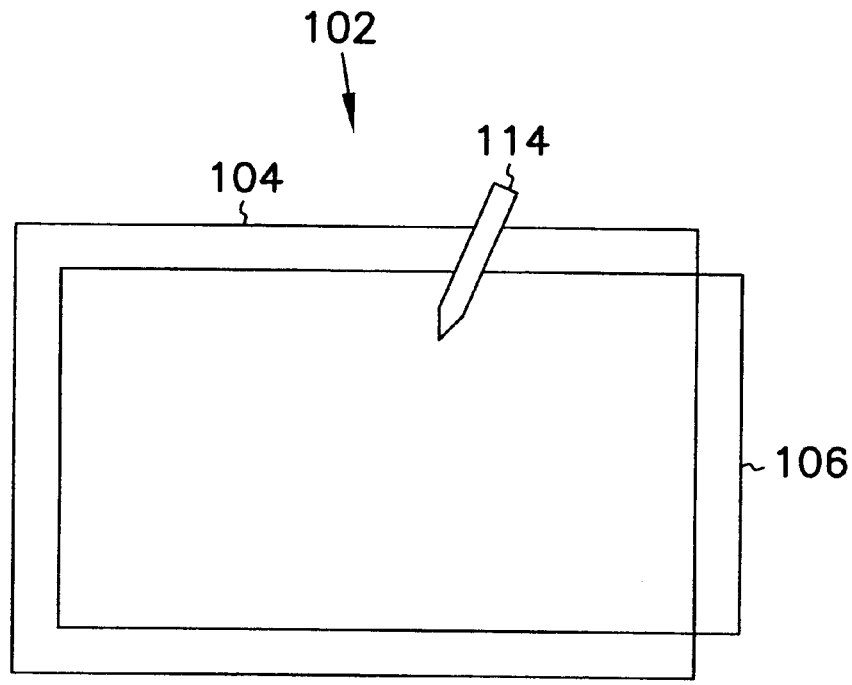
FIG. 1A illustrates one embodiment of a grid pattern.
Figure 1B:
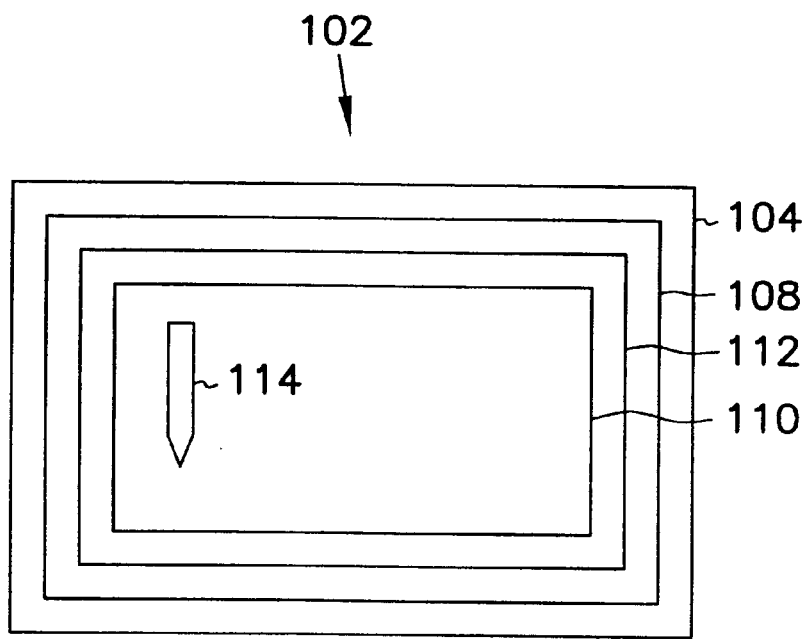
FIG. 1B illustrates one embodiment of a directional grid.

The invention provides a grid pattern having a reduced complexity. As illustrated in FIG. 1A, one embodiment of the grid pattern 102 includes two overlapping directional grids, an x-grid 104 and a y-grid 106, to ascertain the position of a transducer 114 respectively in the x- and y-axes. In another embodiment, each directional grid 104, 106 includes two or more different overlapping grids. The grids are formed by periodic patterns as will be subsequently illustrated. Thus, for example, each directional grid 104, 106 includes a fine resolution grid 112, a coarse resolution grid 110 and a lateral resolution grid 108, as illustrated in FIG. 1B.

If the grid pattern is relatively small, in an alternative embodiment, only fine and coarse resolution grids 112, 110 are used. It will be apparent to one skilled in the art that absolute transducer position is defined using only fine and coarse resolution grids 112, 110 where the total length of a directional grid is less than or equal to the quantity n*m/(n-m), where n is the periodic length of coarse resolution grid 110 and m is the periodic length of fine resolution grid 112. At this length, alignment of periods of fine and coarse resolution grids 112, 110 occurs only once, thus providing for unique signal resolution. For longer lengths, additional resolution grids are necessary to resolve repetition of alignment patterns. The grid pattern of the exemplary embodiment of FIG. 1B, using three layers of resolution grids, presumes a repetition of alignment patterns of the fine and coarse resolution grids 112, 110.

Figure 1C:
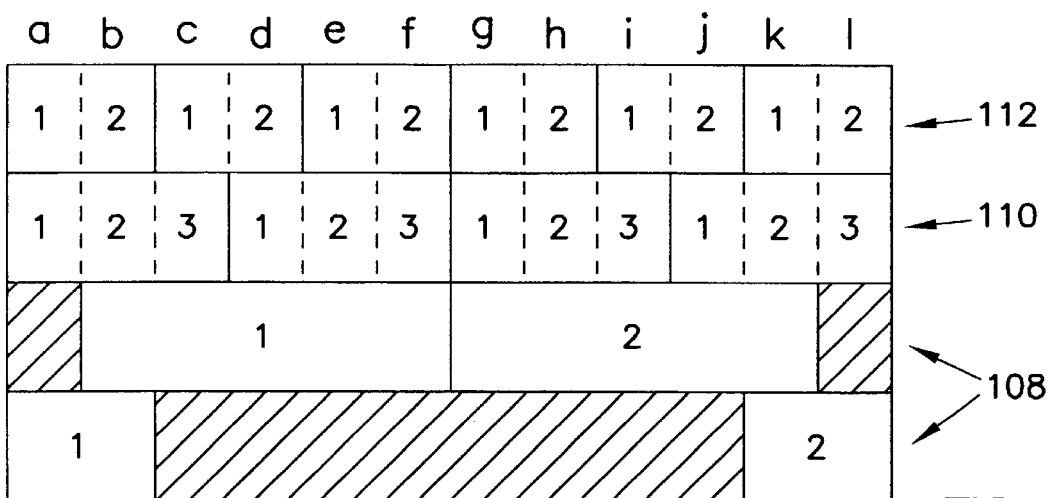
FIG. 1C is a block diagram of signal values of one embodiment of a directional grid.

As an example, consider a three layer directional grid having a fine resolution grid 112 with six 2-inch periods, a coarse resolution grid 110 with four 3-inch periods and a 12-inch lateral resolution grid 108 utilizing a foldback serpentine and a fragmented foldback serpentine. FIG. 1C is a block diagram representing the signals generated for a given transducer position in this hypothetical example. For simplicity, these signals are designated as one, two or three and are unique for each one-inch segment of the fine and coarse resolution grids 112, 110 and each hemisphere of the serpentines of the lateral resolution grid 108. If a transducer is at the location designated e in FIG. 1C, the fine resolution grid 112 will detect a signal of 1 indicating that the transducer location belongs to the set of locations containing a, c, e, g, i or k. The coarse resolution grid 110 will detect a signal of 2 indicating that the transducer location belongs to the set of locations containing b, e, h or k. Using basic set theory, the intersection of sets corresponding to fine and coarse resolution grids 112, 110 are e and k. There are two possible transducer locations at this stage of the analysis, location e or k, due to the repetition of alignment patterns; the alignment pattern of fine and coarse resolution grids 112, 110 beginning at location a is repeated beginning at location g. Further resolution by the lateral resolution grid 108 is thus necessary. The lateral resolution grid 108 will detect a signal of 1 indicating that the transducer location belongs to the set of locations in the first hemisphere, or a location between a and f. Analysis of the intersection of the three sets of values will provide a unique position location of e.

If the grid pattern is smaller yet, in a further embodiment, only fine resolution grid 112 is used. It will be apparent to one skilled in the art that absolute transducer position is defined using only fine resolution grid 112 where the total length of a directional grid is less than or equal to the periodic length of fine resolution grid 112.

In the exemplary embodiment of FIG. 1B, the position of the transducer 114 in one axis can be ascertained by monitoring the electrical signals present in the different resolution grids 108, 110, 112 of the corresponding directional grid 104, 106. In one embodiment, the transducer 114 emits a magnetic signal coupled to the grid pattern 102. The transducer 114 location can be determined in the following manner. First, signals induced in the fine resolution grid 112 are analyzed to determine the relative location of the transducer 114 within a period of the fine resolution grid 112. Second, signals induced in the coarse resolution grid 110 are analyzed to resolve which pair of periods in the fine resolution grid 112 to which the transducer 114 may be proximate, each period occurring in a different hemisphere of its corresponding directional grid. The period of the fine resolution grid 112 producing the signal cannot be resolved to a unique value upon analysis of coarse resolution grid 110 due to repetition of the alignment patterns of fine and coarse resolution grids 112, 110 of the exemplary embodiment. Finally, signals induced in the lateral resolution grid 108 are analyzed to identify the specific period of the pair of periods in the fine resolution grid 112 to which the transducer is proximate. However, before describing this technique in further detail, a grid pattern provided by the invention will be further described.

Figure 1D:
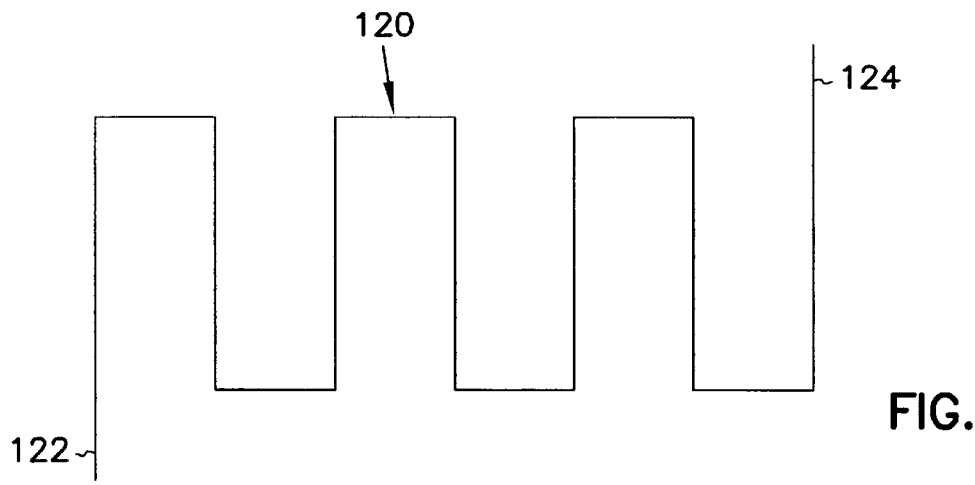
FIG. 1D illustrates one embodiment of a serpentine.
Figure 1E:
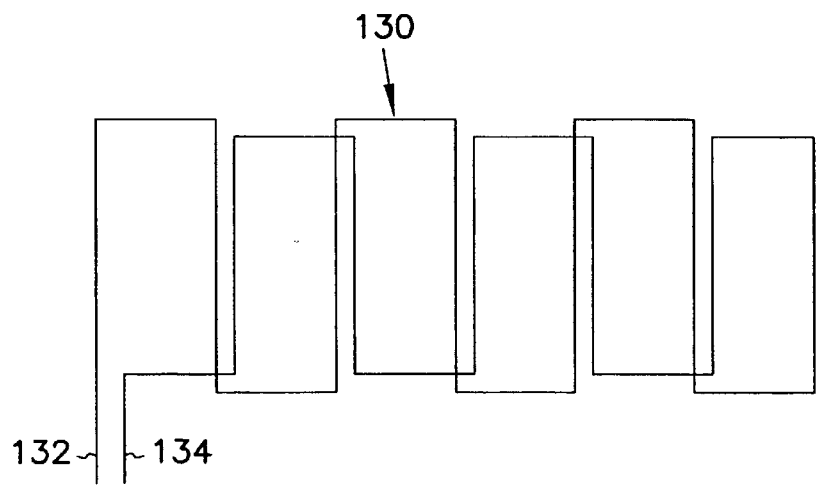
FIG. 1E illustrates one embodiment of a foldback serpentine.

The invention provides a grid pattern that is less complex than conventional grids, to reduce its cost and complexity, and to diminish the processing time and complexity of the corresponding electronic circuitry. The elemental component of the invention is the serpentine which is a patterned conductor. A serpentine 120, having a first end 122 and a second end 124, is illustrated in FIG. 1D. A variety of the serpentine is the foldback serpentine. A foldback serpentine incorporates the basic pattern of the serpentine, but it reverses direction such that its first end and second end are neighboring. A foldback serpentine 130, having a first end 132 and second end 134, is illustrated in FIG. 1E.

Figure 2:
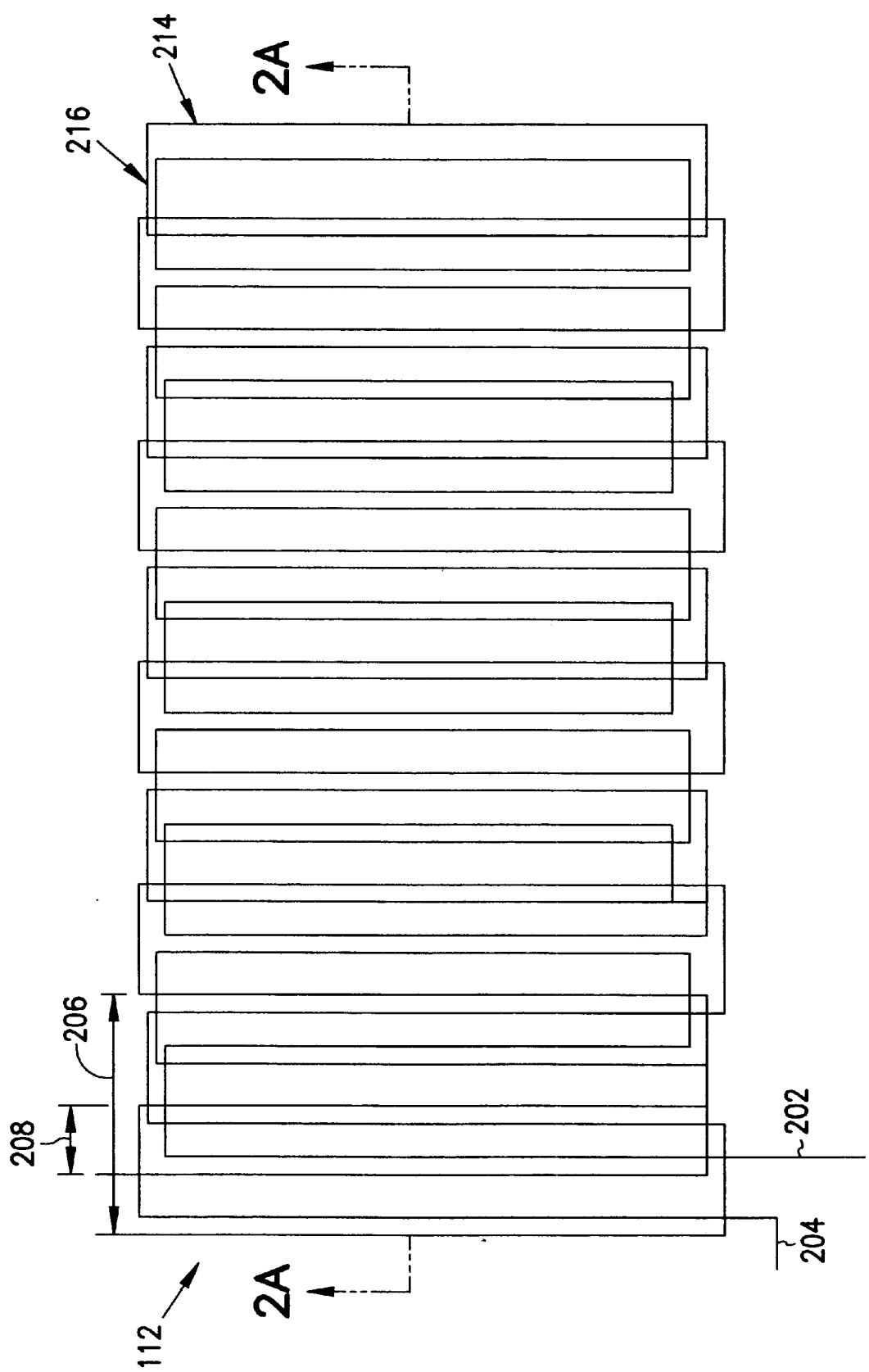
FIG. 2 illustrates one embodiment of a fine resolution grid incorporating rectangular foldback serpentines.

In one embodiment, the invention provides a fine resolution grid 112 that is comprised of only two overlapping serpentine patterns 202, 204 that fold back upon themselves, as illustrated in FIG. 2. In another embodiment, the length 206 of the periods of each serpentine pattern 202, 204 is two inches.

Figure 2A:
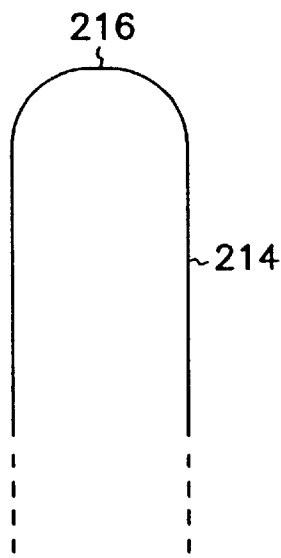
FIG. 2A illustrates a rounded serpentine.
Figure 2B:
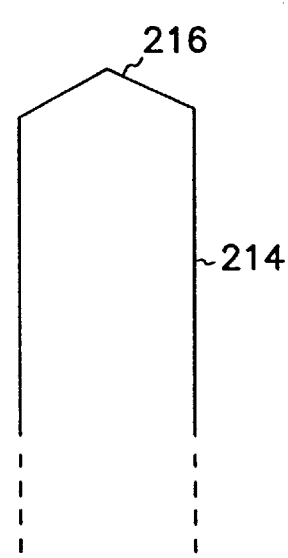
FIG. 2B illustrates an angled serpentine.

The major legs of a serpentine pattern are those legs that are perpendicular to the axis of the resolution grid. The axis of the resolution grid is generally parallel to the line 2A—2A as illustrated in FIG. 2. The minor legs are those connecting the major legs. Leg 214 is an example of a major leg of serpentine pattern 202 while leg 216 is an example of a minor leg of serpentine pattern 202. The shape of the serpentine patterns may be rectangular, as shown in FIG. 2, or they may be rounded, angled or otherwise connected to facilitate circuit layout. FIG. 2A is an example of a rounded serpentine pattern. FIG. 2B is an example of an angled serpentine pattern. The major legs of all serpentines are substantially parallel to one another in the area of grid pattern 102 where determination of transducer position is desired.

A foldback serpentine has two benefits. First, the amplitude of a signal induced into the foldback grid by the transducer 114 is doubled. Second, the foldback grid has a symmetrical pattern. Therefore, the foldback grid does not require a return conductor which could pick up spurious signals that could cause the transducer 114 location to be erroneously determined.

Figure 3A:
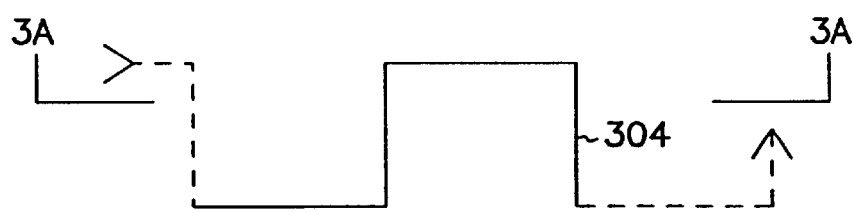
FIG. 3A illustrates one embodiment of one period of a serpentine.
Figure 3B:
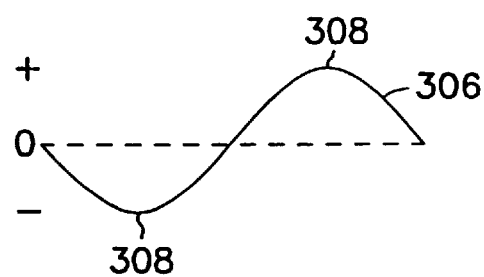
FIG. 3B illustrates one embodiment of a sinusoidal amplitude distribution.

Operation of the fine resolution grid 112 will now be described. One period of a serpentine 304 is illustrated in FIG. 3A. When a transducer 114 is proximate to the serpentine 304, a current is induced in the serpentine 304. As the transducer 114 is moved across the serpentine 304 in a direction substantially parallel to line 3A—3A, the induced current has a sinusoidal amplitude distribution 306 across the serpentine 304, as illustrated in FIG. 3B. As the period of the serpentine 304 is repeated, the sinusoidal amplitude distribution 306 is also correspondingly repeated.

By utilizing the sinusoidal amplitude distribution 306, the relative position of the transducer 114 can be readily resolved within a period of the serpentine 304. However, the specific period of the serpentine 304 that is proximate to the transducer 114 can not be identified.

Furthermore, the position of the transducer 114 cannot be accurately resolved in regions of the serpentine 304 where the sinusoidal amplitude distribution 306 is non-linear. The diminished accuracy arises because of the reduced slope of the sinusoidal amplitude distribution 306 in such non-linear regions 308. This problem is known as S-curve error. To diminish S-curve error, conventional fine resolution grids 112 use at least three separate serpentines 304. However, the use of so many serpentines 304 and corresponding requisite electronic circuitry increases complexity and cost.

Figure 3C:
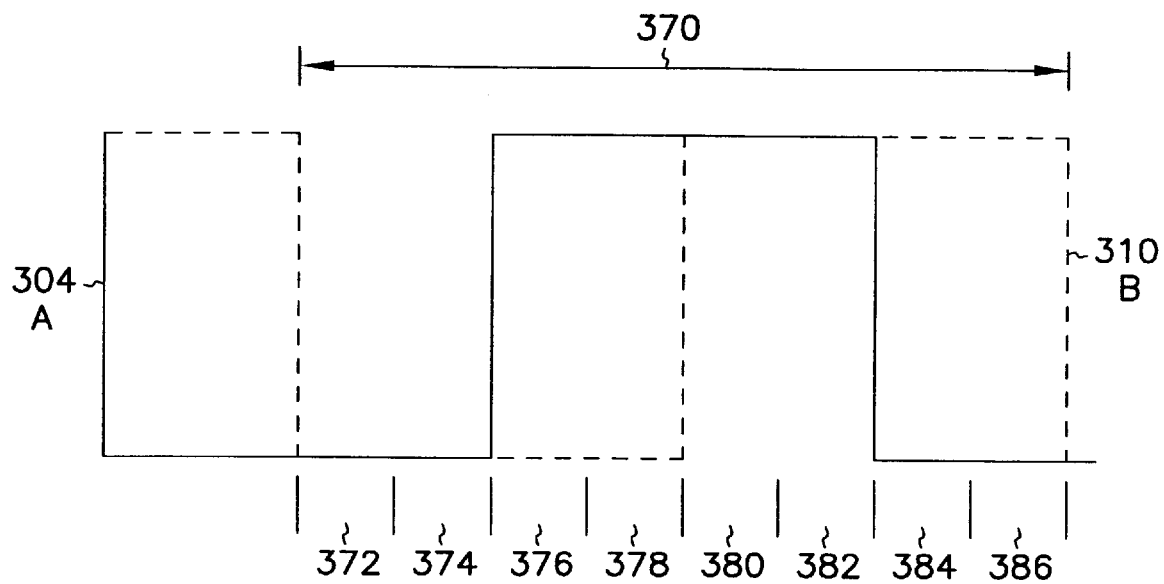
FIG. 3C illustrates one embodiment of two offset serpentines of a fine resolution grid.

To improve measurement accuracy, but diminish complexity and cost, the fine resolution grid 112 according to the invention includes two serpentines 304, 310, as illustrated in FIG. 3C. The second serpentine 310 overlaps and is offset by approximately ninety degrees from the first serpentine 304.

One method of accurately determining transducer 114 location within a period of a serpentine 304 that is part of a fine resolution grid 112 having two serpentines will now be described. This method is accurate, in part, because it reduces S-curve error.

Figure 3D:
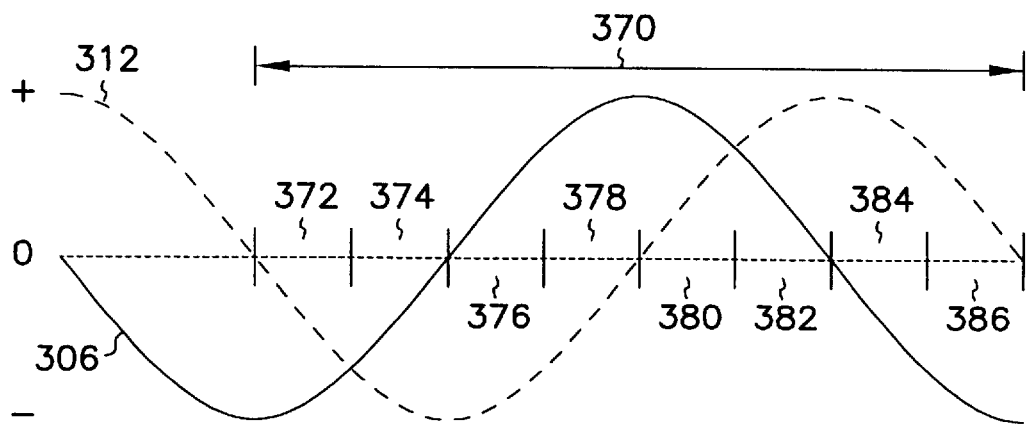
FIG. 3D illustrates one embodiment of a sinusoidal amplitude distribution corresponding to the fine resolution grid of FIG. 3C.

Each serpentine 304, 310 has a corresponding sinusoidal amplitude distribution 306, 312, as illustrated in FIG. 3D and described above. A period 370 of a serpentine 304, 310 and its corresponding sinusoidal amplitude distribution 306, 312 comprise eight sections 372, 374, 376, 378, 380, 382, 384, 386.

The section to which the transducer 114 is proximate can be readily ascertained by evaluating the phase and magnitude of the signal induced into the fine resolution grid 112. For example, when the transducer 114 is proximate to a section 374 of a period in a fine resolution grid 112, the signal induced into a first serpentine 304 has a relative magnitude less than or equal to $\sqrt{2}$ and a relative phase that is negative. The signal induced into a second serpentine 310 has a relative magnitude greater than or equal to $\sqrt{2}$ and a relative phase that is negative.

The position of the transducer 114 within a period of a serpentine can be more accurately and precisely determined, as will be subsequently illustrated. In each section, 386, the slopes of the magnitudes of the sinusoidal amplitude distributions 306, 312 are correspondingly relatively low and high. The low slope of one of the sinusoidal amplitude distributions 306, 312 gives rise to the S-curve error. To reduce the S-curve error, and thus enhance the accuracy of determining transducer 114 location, transducer 114 position is calculated using the ratio of the relative signal magnitudes, where the relative magnitude of the signal having a relatively low slope is placed in the denominator of the ratio.

Because only two serpentines 304, 310 need to be used to accurately determine the location of a transducer within a period of those serpentines, 304, 310, a less complex and less expensive grid and associated electronic circuitry can be implemented. Furthermore, the speed of determining the location of a transducer 114 is improved because fewer serpentines 304, 310 are used in the grid 102.

In a further embodiment of the invention, a method of determining transducer 114 location on a grid pattern 102 having a fine resolution grid 112 with two serpentines 304, 310, will now be illustrated. In one embodiment, the grid pattern 102 includes an x-grid 104 and a y-grid 106 having identical dimensions. However, the method can readily be modified by one skilled in the art when used with an x-grid 104 and y-grid 106 having different dimensions.

Figure 4A:
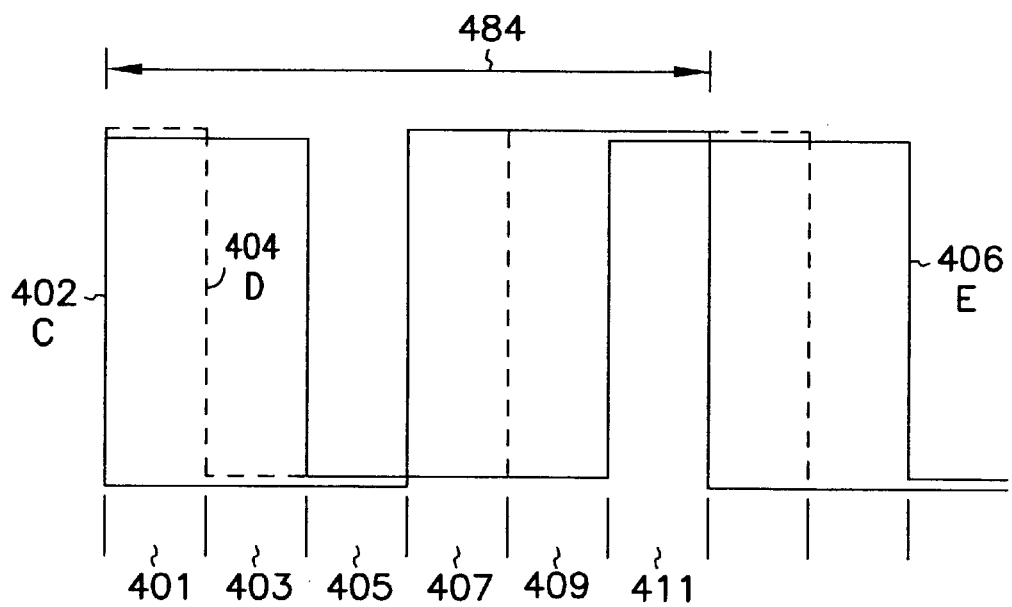
FIG. 4A illustrates one embodiment of a coarse resolution grid.
Figure 4B:
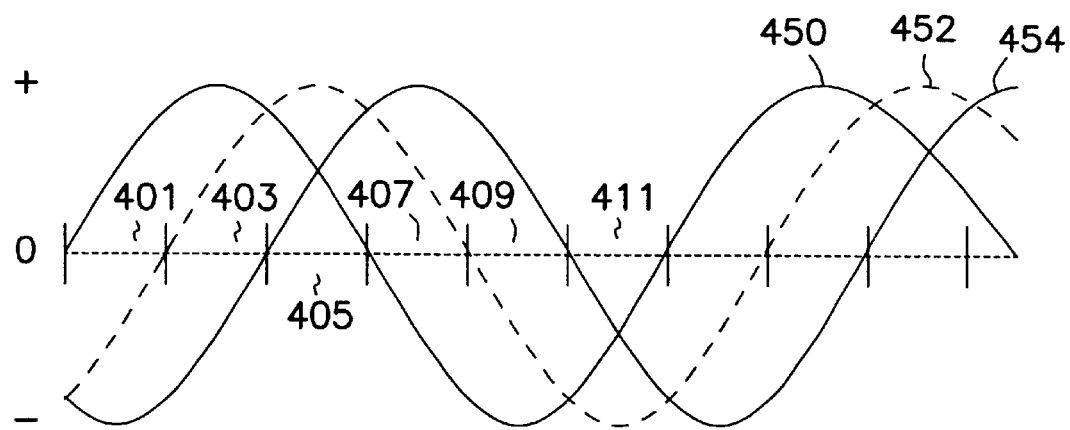
FIG. 4B illustrates one embodiment of a sinusoidal amplitude distribution corresponding to the coarse resolution grid of FIG. 4A.
Figure 4C:
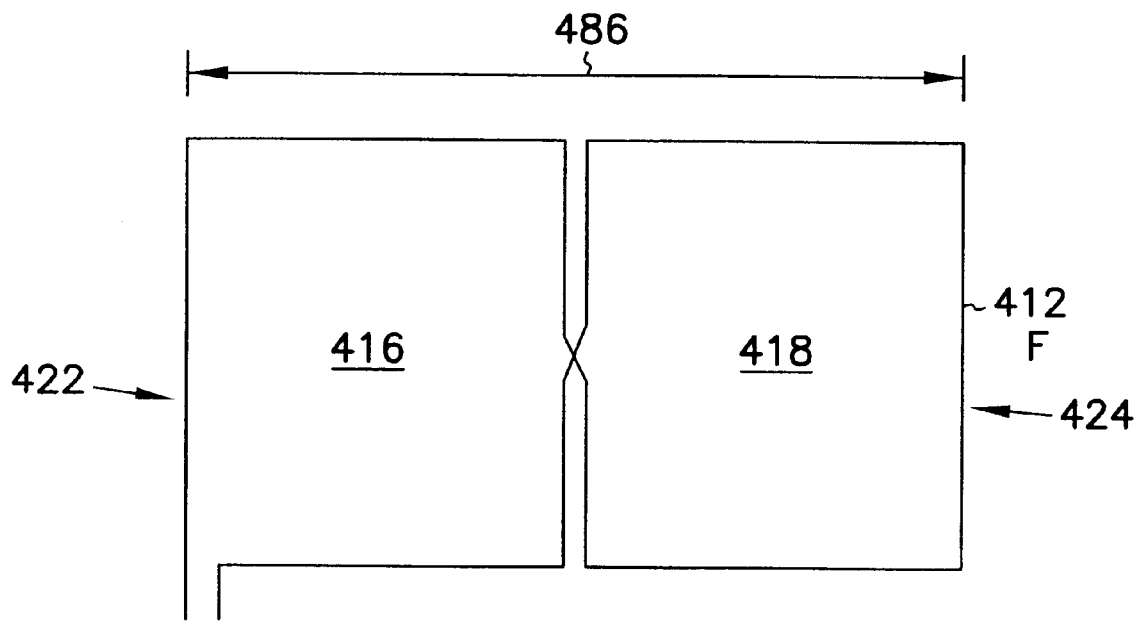
FIG. 4C illustrates one embodiment of a foldback serpentine of a lateral resolution grid.
Figure 4D:
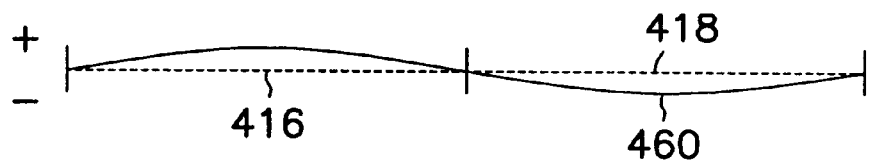
FIG. 4D illustrates one embodiment of a sinusoidal amplitude distribution corresponding to the foldback serpentine of FIG. 4C.
Figure 4E:
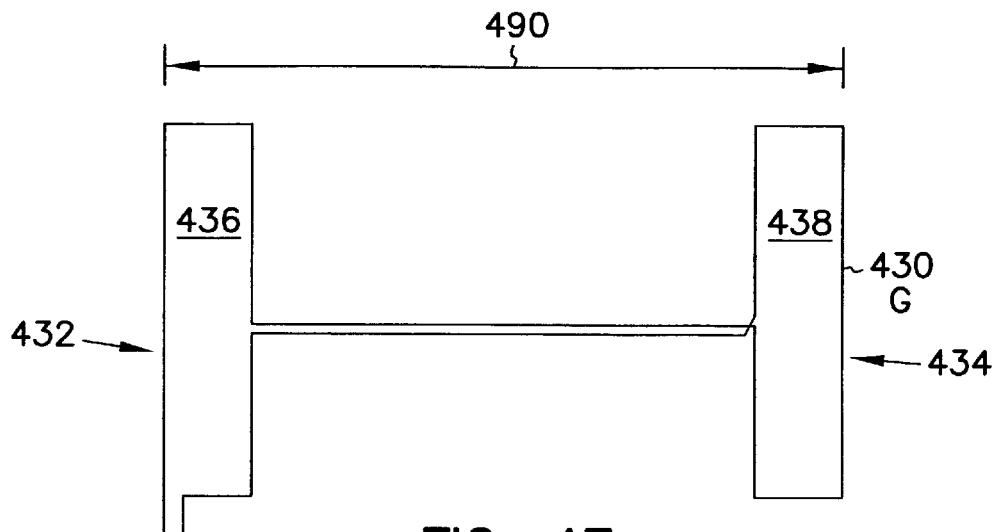
FIG. 4E illustrates one embodiment of a fragmented foldback serpentine of a lateral resolution grid.

In one embodiment, each x-grid 104 and y-grid 106 include a fine resolution grid 112 as illustrated in FIG. 3C, a coarse resolution grid 110 as illustrated in FIG. 4A, and a lateral resolution grid 108 as illustrated in FIGS. 4C and 4E. For drawing simplicity and readability, only a portion of fine and coarse resolution grids 112, 110 are represented. Furthermore, the foldback lines are not shown for fine and coarse resolution grids 112, 110 as they affect only the signal strength, and do not affect determination of position as described herein. The fine, coarse and lateral resolution grids 112, 110, 108 overlap one another, as illustrated in FIG. 1B and subsequently described. In one embodiment, illustrated below, the x-grid 104 is approximately ten inches in length.

The serpentines 304, 310 of the fine resolution grid 112 fold back and are respectively designated A and B. In one embodiment, the serpentines 304, 310 have a periodic length 370 of approximately two inches. As described above, each period includes eight sections 372, 374, 376, 378, 380, 382, 384, 386. Because of the ninety-degree offset of the individual serpentine patterns, fine resolution grid 112 having five periods in each serpentine will have an approximate total length of ten and one-half inches.

The coarse resolution grid 110, in one embodiment, includes three foldback serpentines 402, 404, 406, respectively designated C, D and E, as illustrated in FIG. 4A. The foldback serpentines 402, 404, 406 in the coarse resolution grid 110 are successively offset from one another by approximately sixty degrees. The foldback serpentines 402, 404, 406 generate signal patterns 450, 452, 454 respectively, as illustrated in FIG. 4B. In a further embodiment, each serpentine 402, 404, 406 has a periodic length 484 of approximately three inches. Each period of a serpentine 402, 404, 406 in the coarse resolution grid includes six segments 401, 403, 405, 407, 409, 411. Because of the offset of the individual serpentine patterns, coarse resolution grid 110 has an approximate total length of ten inches.

Figure 4F:
FIG. 4F illustrates one embodiment of a sinusoidal amplitude distribution corresponding to the fragmented foldback serpentine of FIG. 4C.
Figure 4G:
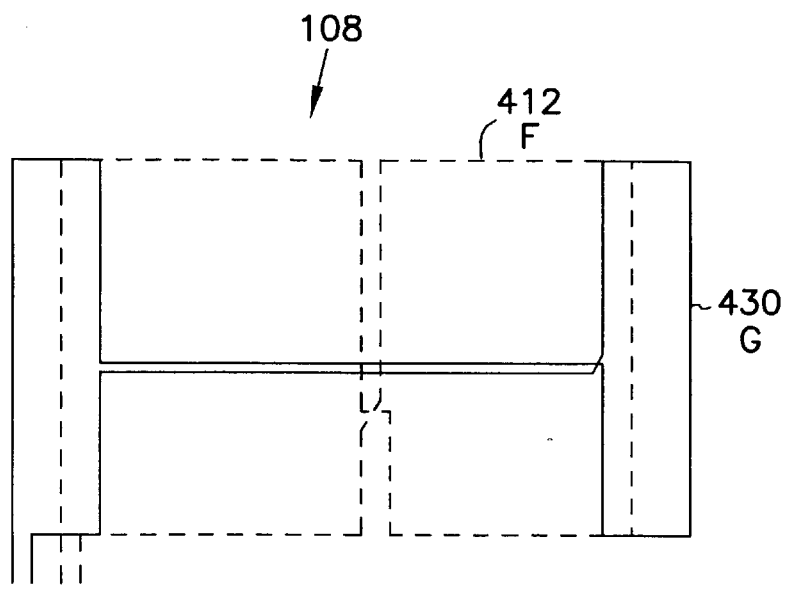
FIG. 4G illustrates one embodiment of a lateral resolution grid.

Finally, in one embodiment, the lateral resolution grid 108 includes one foldback serpentine 412 designated F and illustrated in FIG. 4C, and one fragmented foldback serpentine 430 designated G and illustrated in FIG. 4E. The foldback serpentine 412 generates signal pattern 460 as illustrated in FIG. 4D, and the foldback serpentine 430 generates signal pattern 462 as illustrated in FIG. 4F. In one embodiment, foldback serpentine 412 is substantially concentric with fragmented foldback serpentine 430 to form lateral resolution grid 108 as illustrated in FIG. 4G. In a further embodiment, the serpentine 412 in the lateral resolution grid 108 has a periodic length 486 of approximately nine inches and the serpentine 430 in the lateral resolution grid 108 has a periodic length 490 of approximately ten inches. The period of serpentine 412 in the lateral resolution grid includes two sides, 416 and 418. The period of serpentine 430 in the lateral resolution grid includes two sides, 436 and 438.

The fine, coarse and lateral resolution grids 112, 110, 108 are substantially centered on one another so that the edges of fine, coarse and lateral resolution grids 112, 110, 108 are substantially proximate to one another.

Figure 4H:
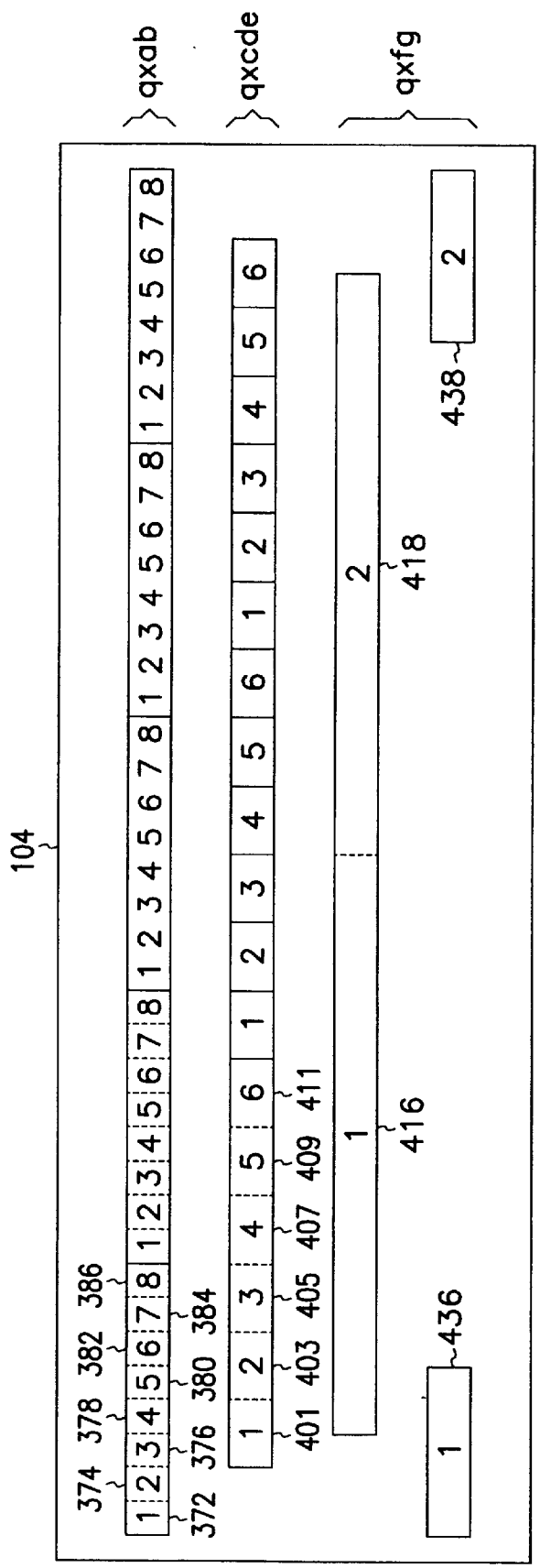
FIG. 4H is a block diagram of section, segment and side values of one embodiment of a directional grid.

The following exemplary method is used to determine the location of the transducer 114 when it is proximate to the grid pattern 102. It will be apparent that through the comparison of signals received on resolution grids of varying periods, an absolute position is determined. In the following text, Abs means absolute value of. For conceptualization, reference to FIG. 4H provides a block diagram of the relative section, segment and side values designated in the following method of the invention.

Transducer 114 position in the x-axis is determined using the x-grid 104. Initially, the section, proximate to the transducer 114, in a period of the fine resolution grid 112 is determined. In the following descriptions, designation of section, segment or side value is arbitrary and any value or designation may be utilized to develop the logic tables for use in the invention. Furthermore, it will be recognized by those skilled in the art that the chosen placement and spacing of the wires of the resolution grids will determine actual signal characteristics of each resolution grid as the transducer is moved along the axis of a direction grid. However, it will also be recognized by those skilled in the art that the appropriate logic tables can be readily developed without undue experimentation from the signal pattern generated by each resolution grid in use with the method of the invention described herein.

The section is determined by calculating the difference between the vector signals present in serpentines A 304 and B 310, as illustrated below. The section is identified as variable qxab. The vector signals present on serpentines A 304 and B 310 are identified respectively as xa and xb.

If xa>=0 And xb<0 And Abs(xb)>xa then qxab=3 (376)

If xa>0 And xb<=0 And Abs(xb)<xa then qxab=4 (378)

If xa>0 And xb>=0 And xa>xb then qxab=5 (380)

If xa>=0 And xb>0 And xb>xa then qxab=6 (382)

If xa<=0 And xb>0 And xb>Abs(xa) then qxab=7 (384)

If xa<0 And xb>=0 And Abs(xa)>xb then qxab=8 (386)

If xa<0 And xb<=0 And Abs(xa)>Abs(xb) then qxab=1 (372)

If xa<=0 And xb<0 And Abs(xa)<Abs(xb) then qxab=2 (374)

Then, the segment, proximate to the transducer 114, in a period of the coarse resolution grid 110 is ascertained with reference to signal patterns 450, 452, 454. The segment is determined by calculating the difference between the vector signals present on the serpentines C 402, D 404, and E 406. Using three serpentine patterns, this is a digital technique, illustrated below, because it is not necessary to compare the magnitudes of the vector signals in the manner used to determine qxab. The segment is identified as variable qxcde. The vector signals present on serpentines C 402, D 404, and E 406 are identified respectively as xc, xd and xe.

If xc>=0 And xd<0 And xe<0 then qxcde=1 (401)

If xc>=0 And xd>=0 And xe<0 then qxcde=2 (403)

If xc>=0 And xd>=0 And xe>=0 then qxcde=3 (405)

If xc<0 And xd>=0 And xe>=0 then qxcde=4 (407)

If xc<0 And xd<0 And xe>=0 then qxcde=5 (409)

If xc<0 And xd<0 And xe<0 then qxcde=6 (411)

If xc~0 And xd~0 then qxcde=0

If xd~0 And xe~0 then qxcde=0

A value of zero for qxcde indicates that the transducer is at or beyond the boundaries of coarse resolution grid 110. As illustrated in FIG. 4H, fine resolution grid 112 extends beyond the boundaries of coarse resolution grid 110 such that coarse resolution grid 110 will not detect a segment value when fine resolution grid 112 detects a section value of 1 or 2 in the first period, or 7 or 8 in the last period.

As an alternative method, segment determination within coarse resolution grid 110 can depend on the vector signal having the lowest magnitude, thus indicating to which serpentine the transducer is closest. However, since this segment pattern will repeat twice within each period of coarse resolution grid 110, this method reduces the overall direction grid length possible without providing additional resolution grids.

Next, the exact position of the transducer relative to a proximate period of the fine resolution grid 112 is calculated, as illustrated below. The following method compensates for S-curve error as previously described. xab is the relative transducer position within a period of the fine resolution grid 112.

If qxab=1 then xab=Abs(xb)*250/Abs(xa)

If qxab=2 then xab=500−(Abs(xa)*250/Abs(xb))

If qxab=3 then xab=500+(Abs(xa)*250/Abs(xb))

If qxab=4 then xab=1000−(Abs(xb)*250/Abs(xa))

If qxab=5 then xab=1000+(Abs(xb)*250/Abs(xa))

If qxab=6 then xab=1500−(Abs(xa)*250/Abs(xb))

If qxab=7 then xab=1500+(Abs(xa)*250/Abs(xb))

If qxab=8 then xab=2000−(Abs(xb)*250/Abs(xa))

Then, the position of the transducer 114 position relative to the lateral resolution grid 108 is ascertained with reference to signal patterns 460, 462. The side is identified as variable qxfg. The vector signals 442, 444 present on serpentines F 412 and G 414 are identified respectively as xf and xg.

If xf>0 or xg>0 then qxfg=1(416 or 436)

If xf<0 or xg<0 then qxfg=2(418 or 438)

Finally, the transducer 114 location is determined in the following manner. xab is scaled based upon the value of the CDE grid segment, qxcde, and the FG grid side, qxfg. To simplify the software implementation, qxfg, qxcde and qxab are combined into one three-digit number, where qxfg is the most significant bit and qxab is the least significant bit. The three-digit number is evaluated to determine how to scale the relative transducer 114 position xab.

If three-digit number=101, 102, 113, 114, 125, 126, 137 or 138 then xab1=xab If three-digit number=141, 142, 153, 154, 165, 166, 117 or 118 then xab1=xab+2000

If three-digit number=n21, n22, n33, n34, n45, n46, n57 or n58 then xab1=xab+4000

(Where "n" represents any value for qxfg. Near the center of FG it is possible to ignore the value of qxfg because of the unique signal combinations of qxab and qxcde. Furthermore, ignoring the value of qxfg near the center avoids the difficulties of detecting the polarity shift which involves low signal magnitude and a susceptibility to transducer tilt errors.)

If three-digit number=261, 262, 213, 214, 225, 226, 237 or 238 then xab1=xab+6000

If three-digit number=241, 242, 253, 254, 265, 266, 207 or 208 then xab1=xab+8000

Upon calculating the scaled transducer position, xab1, in the x-axis, an analogous procedure must be performed to determine the scaled transducer position in the y-axis. The scaled transducer 114 position in the y-axis is obtained using the same technique used to calculate the scaled transducer 114 position in the x-axis. However, because the y-axis may be shorter than the x-axis, the three-digit numbers used to calculate the scaled y-axis transducer 114 position, yab1, may be different than those used in the x-axis calculations.

Also, it is preferable to fabricate grid patterns 102 inexpensively. In one embodiment, a grid pattern 102 can be fabricated inexpensively with Mylar® insulator and silver conductor. Because silver is relatively expensive, it is desirable to diminish the number of conductors in the grid pattern 102.

Figure 5A:
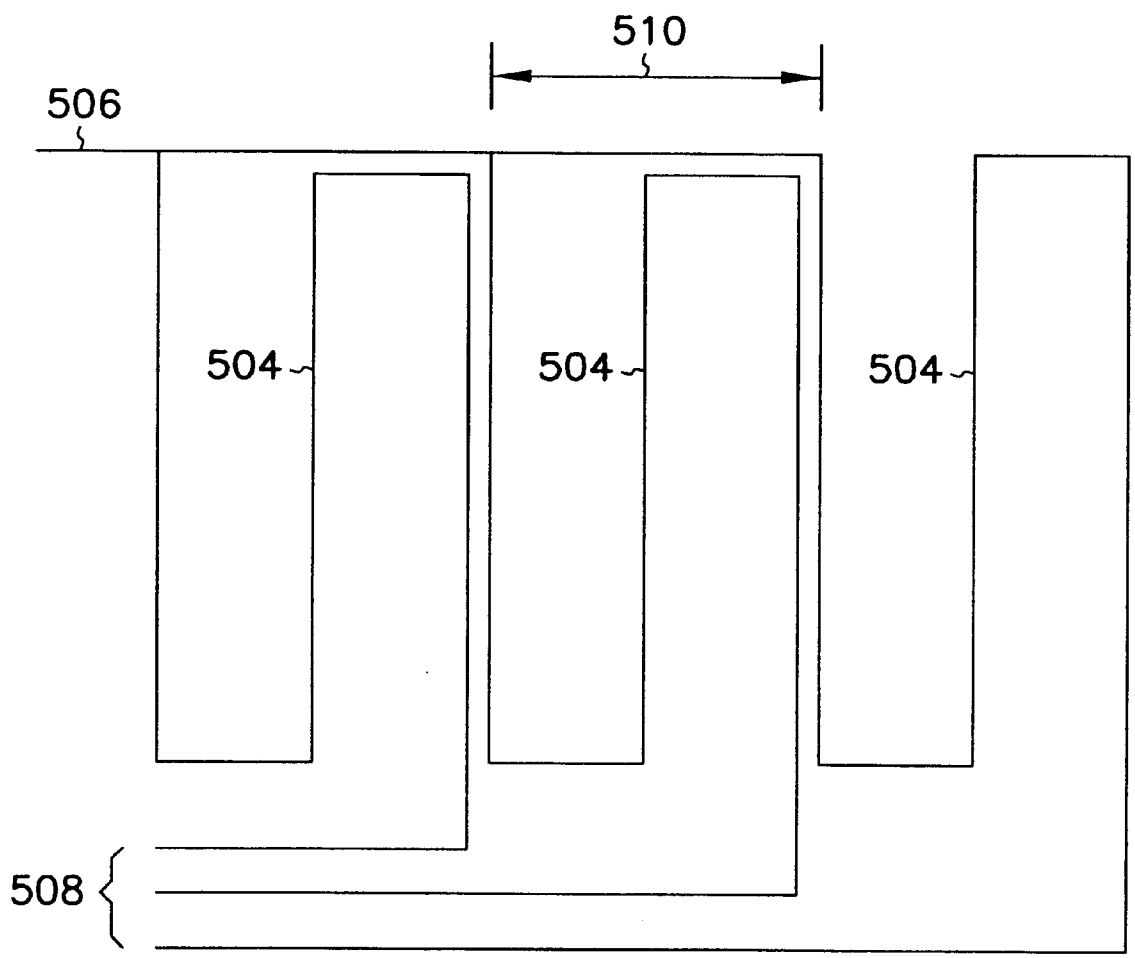
FIG. 5A illustrates one embodiment of a segmented grid.

In one embodiment, the number of conductors in a coarse resolution grid 110 can be reduced by using a segmented grid 502, as illustrated in FIG. 5A. The segmented grid 502 includes serpentine periods 504, each coupled to ground through a return line 506 and having a unique output 508. Thus, the serpentine periods 504 are relatively isolated from one another. In one embodiment, the serpentine periods 504 have a length 510 equal to the length 206 of the serpentine period in the fine resolution grid, e.g., two inches. Using this technique, lateral resolution grid 108 can be eliminated due to the one-to-one correspondence of the individual serpentine periods 504 to periods of fine resolution grid 112.

The coarse resolution grid 110 is overlaid on the fine resolution grid 112 illustrated in FIG. 2 to form a directional grid 104, 106. Two such directional grids, i.e., an x-grid 104 and a y-grid 106, form a grid pattern 102. Transducer 114 position on the grid pattern 102 can be ascertained in a manner similar to the method previously described as understood by persons skilled in the art. For example, the relative position of the transducer 114 within one period of a serpentine can be determined in one direction with the fine resolution grid 112. Then, the exact period of the fine resolution grid to which the transducer 114 is proximate can be found using the signals from outputs 508 of the coarse resolution grids 110. Thus, the position of the transducer 114 can be accurately and precisely resolved.

Figure 6:
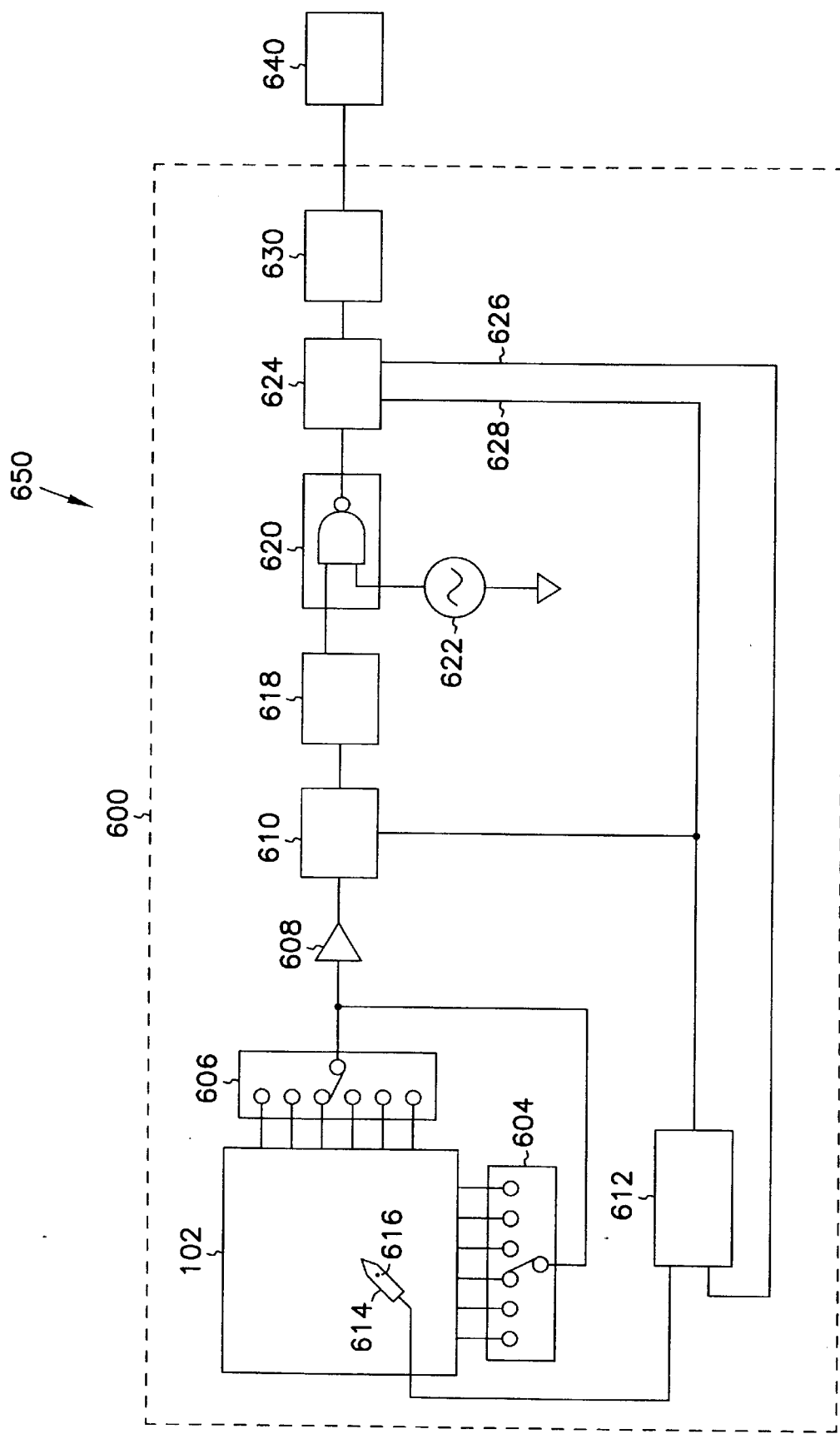
FIG. 6 illustrates one embodiment of a data system.

The pattern according to the invention may be incorporated in a tablet. FIG. 6 illustrates one embodiment of the invention that is a data system 650 including tablet 600 coupled to a first processor 640 through a second level converter 630. The first processor 640 may by microprocessor, such as on Pentium II processor made by Intel Corporation (Santa Clara, Calif.).

The tablet 600 includes a grid pattern 102 having an x-grid 104 and a y-grid 106. The outputs of the x-grid 104 and y-grid 106 are coupled to x- and y-axis multiplexors 604, 606 in a manner known to persons skilled in the art. The outputs of the x- and y-axis multiplexors 604, 606 are coupled together to the input of an amplifier and filter 608. The outputs of the x- and y-axis multiplexors are provided to the input of the amplifier and filter 608 using time division multiplexing.

The output of the amplifier and filter 608 is coupled to a synchronous detector 610. The synchronous detector 610 is also coupled to a first level converter 612. The first level converter 612 is coupled to a transducer, such as a pen 614 having a switch 616. The first level converter 612 provides a signal to the synchronous detector 610 corresponding to the signal frequency emitted by the pen 614 to the grid pattern 102. The synchronous detector 610 is also coupled to an analog to digital (A/D) converter 618. The A/D converter 618 is coupled to a NAND gate circuit 620. An oscillator 622 is also coupled to the NAND gate circuit 620. The NAND gate circuit is coupled to a second processor 624. The second processor 624 has two couplings 626, 628 to the first level converter 612. The first coupling 626 carries a signal from the second processor 624 to the first level converter 612 indicating whether the switch 616 has been activated. The second coupling 628 carries a signal that corresponds to the signal frequency emitted by the pen 614 to the grid pattern 102. In one embodiment, the signal frequency varies with the pressure at the tip of the pen 614.

Finally, the second processor 624 is coupled to the second level converter 630. In one embodiment, the second level converter 630 is an RS-232 level converter. Operation of the tablet 600 and data system 650 are understood by persons skilled in the art.

CONCLUSION

The invention provides a method and apparatus for diminishing grid complexity in a tablet, and thus reducing the complexity and cost of the associated electronic circuitry. It is an advantage of the invention that tablet cost and complexity is reduced, and grid accuracy is enhanced.

Those skilled in the art will recognize that although the exemplary embodiments discussed a sequence of events, signal processing and evaluation can occur concurrently and no absolute order is implied except where a resultant is dependent upon a previously determined quantity.

Furthermore, periodic lengths referenced in the exemplary embodiments are generally applicable to pen transducers. Serpentines having larger periodic lengths can be utilized for transducers having larger coils and, thus, improved signal characteristics. Serpentines with shorter periodic lengths would certainly provide the same functionality to obtain the same results, albeit with a possible marginal improvement in accuracy. However, such marginal improvements in accuracy would come at the expense of increased circuit complexity for a given overall grid pattern size.

The algorithms described in the specification, and their associated circuitry, are for the specific exemplary embodiments and will require modification dependent upon the component grids chosen to practice the invention. Such modification does not require undue experimentation. A method is described to create layers of resolution grids for resolving transducer position. A fine resolution grid provides measurement accuracy, but will not provide unique resolution of signals to an absolute transducer position if the fine resolution grid contains more than one period. Additional resolution grids may be layered with the fine resolution grid to provide unique resolution of signals. The function of these additional resolution grids is described, allowing the user to readily create the logic tables for unique resolution of signals based on the component grids utilized.

One skilled in the art will also recognize that unique signal resolution can be accomplished without logic tables. In an alternative embodiment, each resolution grid may be evaluated to a set of possible location values rather than period sections, segments or sides. For example, consider a three layer directional grid having a fine resolution grid with six 2-inch periods, a coarse resolution grid with four 3-inch periods and a 12-inch lateral resolution grid. If a transducer is at a location of five inches, the fine resolution grid will detect a signal indicating that the transducer could be at a location of one, three, five, seven, nine or eleven inches. The coarse resolution grid will detect a signal indicating that the transducer could be at a location of two, five, eight or eleven inches. The lateral resolution grid will detect a signal indicating that the transducer is at a location in the first hemisphere, or a location between zero and six inches. Comparison and intersection of the three sets of values will provide a unique position location of five inches as this is the only value common to all three resolution grids. In practice, of course, each possible location will be defined by a detected position with an associated error relating to the accuracy of the resolution grid, but the resulting value ranges will intersect at only one common value.

It is understood that the above description is intended to be illustrative, and not restrictive. Many further embodiments will be apparent to those skilled in the art upon reviewing the above description.

What is claimed is:

1. A grid used to determine transducer position, consisting of:
    a first serpentine to produce a first signal; and
    a second serpentine overlapping the first serpentine to produce a second signal, wherein the second serpentine and the first serpentine form a pattern such that the second signal of the second serpentine compensates the first signal of the first serpentine so as to enhance linearity in determining the transducer position.

2. The grid of claim 1, wherein the first and second serpentines are foldback serpentines.

3. The grid pattern of claim 1, wherein the first serpentine is offset from the second serpentine by approximately ninety degrees.

4. A grid used to determine transducer position, comprising:
- an x-grid;
- a y-grid;
- wherein the x-grid and y-grid each include a coarse and a fine resolution grid; and
- wherein each fine resolution grid consists of:
  - a first serpentine to produce the first signal, and
  - a second serpentine overlapping the first serpentine to produce a second signal, wherein the second serpentine and the first serpentine form a pattern such that the second signal of the second serpentine compensates the first signal of the first serpentine so as to enhance linearity in determining the transducer position.

5. The grid of claim 4, wherein the x-grid and y-grid each further comprise a lateral resolution grid.

6. The grid of claim 4, wherein the first and second serpentines are foldback serpentines.

7. The grid of claim 4, wherein the first serpentine is offset from the second serpentine by approximately ninety degrees.

8. The grid of claim 4, wherein the coarse resolution grid comprises a plurality of segmented grids.

9. The grid of claim 4, wherein the coarse resolution grid consists of three serpentines.

10. A tablet used to determine transducer position, comprising:
- an x-grid;
- a y-grid;
- an x-axis multiplexer coupled to the x-grid;
- a y-axis multiplexer coupled to the y-grid;
- an amplifier and filter coupled to the x-axis and y-axis multiplexors;
- a synchronous detector coupled to the amplifier and filter;
- an analog to digital (A/D) convertor coupled to the synchronous detector;
- a NAND gate circuit coupled to the A/D converter;
- a processor coupled to the NAND gate circuit;
- a first level converter coupled to the processor;
- a second level converter coupled to the processor;
- wherein the x-grid and y-grid each include a coarse and a fine resolution grid; and
- wherein each fine resolution grid consists of:
  - a first serpentine,
  - a second serpentine overlapping the first serpentine, and wherein signals from the first and second serpentines are analyzed to determine the transducer position.

11. The grid of claim 10, wherein the x-grid and y-grid each further comprise a lateral resolution grid.

12. The grid of claim 10, wherein the first and second serpentines are foldback serpentines.

13. The grid of claim 10, wherein the first serpentine is offset from the second serpentine by approximately ninety degrees.

14. The grid of claim 10, wherein the coarse resolution grid comprises a plurality of segmented grids.

15. The grid of claim 10, wherein the coarse resolution grid consists of three serpentines.

16. A system, comprising:
- a processor;
- a tablet, coupled to the processor, including,
  - an x-grid;
  - a y-grid;
  - an x-axis multiplexer coupled to the x-grid;
  - a y-axis multiplexer coupled to the y-grid;
  - an amplifier and filter coupled to the x-axis and y-axis multiplexors;
  - a synchronous detector coupled to the amplifier and filter;
  - an analog to digital (A/D) convertor coupled to the synchronous detector;
  - a NAND gate circuit coupled to the A/D converter;
  - a second processor coupled to the NAND gate circuit;
  - a first level converter coupled to the second processor;
  - a second level converter coupled to the first and second processors;
  - wherein the x-grid and y-grid each include a coarse and a fine resolution grid; and
  - wherein each fine resolution grid consists of:
    - a first serpentine,
    - a second serpentine overlapping the first serpentine, and
    - wherein signals from the first and second serpentines are analyzed to determine the transducer position.

17. The system of claim 16, wherein the x-grid and y-grid each further comprise a lateral resolution grid.

18. The system of claim 16, wherein the first and second serpentines are foldback serpentines.

19. The system of claim 16, wherein the first serpentine is offset from the second serpentine by approximately ninety degrees.

20. The system of claim 16, wherein the coarse resolution grid comprises a plurality of segmented grids.

21. The grid of claim 16, wherein the coarse resolution grid consists of three serpentines.

22. A method of determining transducer position, comprising:
- determining a first set of possible transducer positions using a first resolution grid, wherein determining the first set includes using a first serpentine that produces a first signal and a second serpentine that produces a second signal, and wherein the first signal of the first serpentine compensates the second signal of the second serpentine to enhance linearity;
- determining a second set of possible transducer positions using a second resolution grid; and
- intersecting the first and second sets of possible transducer positions to determine transducer position.

23. The method of claim 22 wherein determining a first set of possible transducer positions comprises use of a first foldback serpentine and second foldback serpentine.

24. The method of claim 23 wherein use of a first foldback serpentine and second foldback serpentine comprises offsetting the second foldback serpentine approximately ninety degrees from the first foldback serpentine.

25. The method of claim 22 wherein determining a second set of possible transducer positions comprises use of a multi-wire resolution grid.

26. The method of claim 25 wherein use of a multi-wire resolution grid comprises a multi-wire resolution grid comprising a plurality of foldback serpentines.

27. The method of claim 25 wherein use of a multi-wire resolution grid comprises a multi-wire resolution grid comprising a plurality of segmented serpentines.

28. The method of claim 22 wherein:
- determining a first set of possible transducer positions comprises determining a relative transducer position and period section;
- determining a second set of possible transducer positions comprises determining a period segment; and intersecting the first and second sets of possible transducer positions to determine transducer position comprises intersecting the period section and period segment, and scaling the relative transducer position based on the intersection of the period section and period segment.

29. A method of determining transducer position, comprising:

determining a first set of possible transducer positions using a first resolution grid, wherein determining the first set includes using a first serpentine that produces a first signal and a second serpentine that produces a second signal, and wherein the first signal of the first serpentine compensates the second signal of the second serpentine to enhance linearity;

determining a second set of possible transducer positions using a second resolution grid;

determining a third set of possible transducer positions using a third resolution grid;

intersecting the first, second and third sets of possible transducer positions to determine transducer position.

30. The method of claim 29 wherein determining a first set of possible transducer positions comprises use of a first foldback serpentine and second foldback serpentine.

31. The method of claim 30 wherein use of a first foldback serpentine and second foldback serpentine comprises offsetting the second foldback serpentine approximately ninety degrees from the first foldback serpentine.

32. The method of claim 29 wherein determining a second set of possible transducer positions comprises use of a multi-wire resolution grid.

33. The method of claim 32 wherein use of a multi-wire resolution grid comprises a multi-wire resolution grid comprising a plurality of foldback serpentines.

34. The method of claim 32 wherein use of a multi-wire resolution grid comprises, a multi-wire resolution grid comprising a plurality of segmented serpentines.

35. The method of claim 29 wherein determining a third set of possible transducer positions comprises use of a lateral resolution grid.

36. The method of claim 35 wherein use of a lateral resolution grid comprises a lateral resolution grid comprising a foldback serpentine and a fragmented foldback serpentine.

37. The method of claim 29 wherein:

determining a first set of possible transducer positions comprises determining a relative transducer position and period section;

determining a second set of possible transducer positions comprises determining a period segment; and determining a third set of possible transducer positions comprises determining a period side; and intersecting the first, second and third sets of possible transducer positions to determine transducer position comprises intersecting the period section, period segment and period side, and scaling the relative transducer position based on the intersection of the period section, period segment and period side.

38. A grid used to determine transducer position, comprising:

means for determining relative transducer position, wherein means for determining includes a first serpentine that produces a first signal and a second serpentine that produces a second signal, and wherein the first signal of the first serpentine compensates the second signal of the second serpentine to enhance linearity; and means for scaling the relative transducer position.

39. The grid of claim 38 wherein the first and second serpentines are foldback serpentines.

40. The grid of claim 38 wherein the means for scaling the relative transducer position comprises a coarse resolution grid.

41. The grid of claim 40 wherein the coarse resolution grid comprises a plurality of segmented grids.

42. The grid of claim 40, wherein the coarse resolution grid consists of three serpentines.

43. The grid of claim 40 wherein the means for scaling the relative transducer position further comprises a lateral resolution grid.

44. The grid of claim 43 wherein the lateral resolution grid comprises a foldback serpentine and a fragmented foldback serpentine.

* * * * *